United States Patent Office 3,210,306
Patented Oct. 5, 1965

3,210,306
WAX COMPOSITIONS
Concetto Thomas Camilli, Morristown, and Leon S. Minckler, Jr., Metuchen, N.J., assignors to Esso Research and Engineering Company, a corporation of Delaware
No Drawing. Filed Apr. 6, 1962, Ser. No. 185,510
10 Claims. (Cl. 260—28.5)

This invention relates to new and improved wax compositions and particularly relates to the use of such compositions in the coating of paperboard milk cartons, food packages, and the like. More particularly, the invention relates to an improved dairy wax composition comprising a mixture of paraffin wax, polyethylene, and a polyolefin polymer of a methyl substituted mono-olefin-1 containing a total of 5 to 8 carbon atoms.

Wax-polyethylene and wax-polyethylene-polyisobutylene blends have been used heretofore as coatings for paper and paper cartons. While such blends have generally given satisfactory performance when used as coating films, they are frequently subject to failure due to cracking, flaking, etc., particularly at the edges and corners of folded cartons and the like, which cartons have been pre-coated with a brittle wax blend prior to the folding operation. Among the various criteria which have proved valuable in predicting the suitability of wax blends as coating materials are such properties as flexibility and ductility. Thus, ductile, soft, and flexible wax blends have been found to have less flaking tendencies than stiff, hard, and brittle wax blends, particularly at low temperatures, e.g., about 40° F. Consequently, there is generally a great demand for more flexible wax formulations, particularly for use on milk cartons where the coating quality is under the close scrutiny of the ultimate consumer who frequently objects to the presence of flaked wax particles in the milk.

It has now been discovered that wax blends having superior flexibility and ductility properties may be prepared by blending a paraffin wax with minor amounts of polyethylene and a polyolefin polymer of a methyl substituted mono-olefin-1 containing a total of 5 to 8 carbon atoms. In particular, such blends exhibit higher elongations (ASTM D 638–60T), plastic flows, and lower moduli of elasticity (ASTM D 638–60T), which properties are direct indices of flexibility and ductility, than the paraffin wax per se, paraffin wax-polyethylene blends or paraffin wax- polyethylene-polyisobutylene blends.

The major component of the compositions of the present invention is paraffin wax, which is generally obtained from distillate fractions of crude oils by methods well known in the art. For example, a common method comprises the chilling of hydrocarbon distillates to precipitate the wax, filtering the oil while cold to separate the wax from the lower freezing component, and the "sweating" of the wax to raise the melting point to the desired value. The resulting crystalline paraffin wax which is useful in this invention will generally have a melting range of about 120° F. to 150° F., e.g., 130° F. to 140° F. (ASTM-D-87–42), a kinematic viscosity at 210° F. of about 3.0 to 5.0 centistokes, e.g., 3.0 to 4.0 centistokes (ASTM-D-445), a boiling range at 10 mm. Hg pressure of about 250° F. to 650° F. preferably about 300 to 600 F., and an oil content of about 0.05 to 1.0 wt. percent, e.g., 0.1 to 0.5 wt. percent.

One minor component of the present invention is polyethylene which may have a Staudinger molecular weight of about 1,000 to 500,000, preferably 5,000 to 300,000 and a density of 0.85 to 0.95, preferably 0.88 to 0.92. It may be prepared, for example, by the "high pressure" process, by subjecting ethylene to temperatures ranging from about 100° C. to 500° C., preferably 150° to 250° C. and pressures of about 1,000 atmospheres to 5,000 atmospheres or higher, in the presence of traces of an oxygen type catalyst. For a given concentration of oxygen, the molecular weight of the polymer is greater when the polymerization proceeds at elevated pressures and relatively low temperatures. The optimum concentration of oxygen is in the range of 0.01% to about 3%. The reaction is exothermic but is readily controlled by cooling coils and produces a white, leathery substance which is slightly thermoplastic at elevated temperatures and highly insoluble in practically all solvents, hydrocarbon and others. Alternatively, the polyethylene may be prepared by the "low pressure" process by contacting ethylene with Ziegler type catalysts in the presence of an inert hydrocarbon solvent such as isopentane, n-heptane, etc., at temperatures of about 0 to 100° C.; and pressures ranging from about 0 to 500 p.s.i.g., e.g., 0 to 100 p.s.i.g. Such catalysts comprise a mixture of a reducing metal-containing material, e.g., diethyl aluminum chloride, methyl aluminum dichloride, triethyl aluminum, etc.; and a reducible heavy transition metal compound, e.g., titanium tetrachloride, titanium tetrabromide, vanadium tetrachloride, etc. The catalyst concentration is usually about 0.1 to 0.5% based on total liquid, and the polymer product concentration is preferably kept between about 2 to 15% based on total content. When the desired degree of polymerization is obtained, a $C_1$ to $C_8$ alkanol such as isopropyl alcohol or n-butyl alcohol, desirably in combination with a chelating agent for deashing such as acetylacetone, is normally added to the reaction mixture to dissolve and deactivate the catalyst and to precipitate the polymer product from solution.

A second minor component of the compositions of the present invention is a polymer of a methyl substituted mono-olefin-1 containing a total of 5 to 8 carbon atoms, which may be exemplified by poly (3-methyl butene-1), poly(2-methyl pentene-1) and poly(4-methyl pentene-1). These polymers may be prepared from the corresponding mono-olefin by techniques well known in the art. For example, the mono-olefin may be polymerized at low temperatures, e.g., from 0° C. to —350° C., preferably from —25 to —150° C., by means of a Friedel-Crafts catalyst such as boron trifluoride or aluminum chloride, in the presence of various diluents such as propane, hexane, methyl chloride, etc. It has also been recently discovered that the above-described Ziegler type catalysts may also be utilized at temperatures ranging from 0 to —150° C. in the presence of a polar solvent such as methyl chloride. The polymers which are useful in the present invention may have Staudinger molecular weights ranging from 1,000 to 500,000, preferably 1,000 to 100,000, and range from soft, tacky and amorphous polymers to rubbery polymers. They are compatible with the paraffin wax hereinbefore described.

In general the compositions of the present invention will comprise a major proportion of paraffin wax; 0.1 to 10 wt. percent, preferably 0.5 to 6 wt. percent of polyethylene; and 0.1 to 30 wt. percent, preferably 1 to 20 wt. percent of the polyolefin polymer; wherein said weight percents are based on the total weight of the composition. It is also to be understood that numerous additives may be used in conjunction with the paraffin wax compositions of the present invention, although the above compositions will suffice for most premium uses. By way of illustration, small amounts of microcrystalline wax may be added to further increase ductility. In addition, small amounts of antioxidants, such as 2-di-tertiary butyl, 4-methoxy phenol or 2,6-di-tertiary butyl paracresol may also be added.

In preparing the compositions of the present invention, the solid polyethylene and the solid polymer of the $C_5$ to $C_8$ olefin may be added, with stirring, to molten paraffin wax, said wax being maintained at a temperature above its melting point, e.g., 170–230° F. The polymers will dissolve in the wax, thereby forming a uniform solution. Upon cooling, a homogeneous blend is produced. Alternatively, a mixture of the two polymers may be placed in any conventional type kneader or roll mill, maintained at a temperature of about 250° F., to which the molten paraffin may be slowly added until increasing amounts of the paraffin wax become easily incorporated into the mixed polymers and the mixture becomes well softened. The rate of addition of the paraffin wax may then be increased until the polymers have dissolved in the wax, whereafter the liquid solution may be diluted in a separate mixing unit, with additional molten paraffin wax to obtain a composition of the desired percentage and proportion.

The above components are preferably blended to give a resulting composition melting at about 120 to 165° F., e.g., 130 to 155° F., and having a kinematic viscosity of 2 to 20 cs. at 210° F., preferably 3 to 9 cs. These compositions may readily be used for coating cartons, paperboard, etc., by application of any of the standard procedures such as dipping the paperboard in a bath containing the molten composition, or by any of the convetnional roll coating procedures.

The invention will be better understood by reference to the following example which is given for the purpose of illustration only and is not to be construed as limiting the scope of the present invention in any way.

EXAMPLE

A series of blends was prepared in order to compare the compositions of the present invention with the paraffin base wax alone; with a wax-polyethylene blend, previously demonstrated in the art to be a useful coating composition; and with a wax-polyethylene-polyisobutylene blend, which has been demonstrated in the prior art to be superior to a wax-polyethylene blend.

The paraffin wax had a melting point of 135° F. (ASTM–D–87–42), a boiling range of 300° F. to 600° F. at 10 mm. Hg, a kinematic viscosity of 3.5 cs. at 210° F. (ASTM–D–445), and an oil content of 0.5 wt. percent (ASTM–D–721).

The polyethylene had a Staudinger molecular weight of 100,000 and a density of 0.90, and was prepared by the high pressure technique.

The polyisobutylene had a Staudinger molecular weight of 20,000.

The polyolefin polymers were prepared from the corresponding monoolefins by the following general procedure. The reaction times varied as will be hereinafter described.

A catalyst solution was prepared by adding 2.73 grams of aluminum chloride to 1000 cc. of boiling methyl chloride and cooled to a temperature of −78° C. in an atmosphere of dry nitrogen. This catalyst mixture was then delivered to a polymerization reactor, containing 100 grams of the monoolefin to be polymerized, and 2300 cc. of n-pentane. The reactor was equipped with a stainless steel stirrer and baffles for rapid agitation and was kept in a nitrogen atmosphere with dry nitrogen being continuously introduced throughout the reaction. The reaction was carried out at −100° C. for a desired time period after which the reaction mixture was quenched with about 50 cc. of isopropyl alcohol. The product was then filtered, washed with isopropyl alcohol and dried.

The molecular weights of the polymer products were found to vary as follows:

The poly (3-methyl butene-1) had a Staudinger molecular weight of 18,000, for a reaction time of about 3 hours.

The poly (2-methyl pentene-1) had a Staudinger molecular weight of 2,500, for a reaction time of about 5 to 10 minues.

The poly (4-methyl pentene-1) had a Staudinger molecular weight of 80,000, for a reaction time of about 30 minutes.

The blends were prepared by melting the paraffin wax, maintaining the molten wax temperature above about 170° F., and adding the desired amounts of the two polymers, with stirring. The resulting solution was cooled to form a homogeneous blend.

The resulting blends were then tested for tensile strength (ASTM D–638–60T), elongation before fracture (ASTM–D–638–60T), plastic flow, and modulus of elasticity (ASTM–D–638–60T) as shown in the following table. The stated percentages are based on the total weight of each blend.

*Table I*

| Blend | Composition | Tensile Strength (p.s.i.) | Elongation Before Fracture (In. × 10³) | Plastic Flow (In. × 10³) | Modulus of Elasticity (p.s.i.) |
|---|---|---|---|---|---|
| 1 | Paraffin wax | 456 | 31 | 0 | 12,500 |
| 2 | Paraffin wax + 4% Polyethylene | | 42 | 0 | 10,800 |
| 3 | Paraffin wax + 4% Polyethylene + 10% Polyisobutylene. | | 65 | 42 | 10,300 |
| 4 | Paraffin wax + 4% Polyethylene + 10% Poly (3-methylbutene-1). | 416 | 98 | 80 | 8,700 |
| 5 | Paraffin wax + 4% Polyethylene + 10% Poly (2-methyl pentene-1). | 624 | 86 | 64 | 8,800 |
| 6 | Paraffin wax + 4% Polyethylene + 10% Poly (4-methyl pentene-1). | 445 | 140 | 116 | 7,100 |

From the above table, it is readily apparent that the compositions of the present invention are more ductile and flexible than the wax alone, the wax-polyethylene blend or the wax-polyethylene-polyisobutylene blend. For example, Blend 6, containing 4% polyethylene and 10% poly (4-methyl pentene-1) exhibits more than a two-fold increase in elongation before fracture, practically a three-fold increase in plastic flow and a significantly lower modulus of elasticity than Blend 3, which contains 4% polyethylene and 10% polyisobutylene. The marked difference in these physical properties results in a considerably more flexible and ductile wax blend which is highly desirable, for example, in the prevention of flaking and cracking of the coating on milk cartons or other packages.

It is to be further noted that the tensile strengths observed for the blends of the present invention are comparable to that of the paraffin wax. In the case of Blend 5, the poly (2-methyl pentene-1), a substantial increase is indicated while a slight decrease is noted for Blend 4, the poly (3-methyl butene-1), and Blend 6, the poly (4-methyl pentene-1). However, since flexibility and ductility are more important factors in wax coatings than tensile strength, this slight decrease for Blends 4 and 6 is not felt to be significant.

What is claimed is:

1. A composition of matter comprising a major proportion of the paraffin wax, 0.1 to 10 wt. percent polyethylene having a Staudinger molecular weight of about 1,000 to 500,000, and 0.1 to 30 wt. percent of a polyolefin polymer of a methyl substituted mono-olefin-1 containing a total of 5 to 8 carbon atoms and having a Staudinger molecular weight of about 1,000 to 500,000.

2. A composition of matter according to claim 1, wherein said paraffin wax has a melting point of about 120° to 150° F.

3. A composition of matter according to claim 1, wherein said polyethylene has a Staudinger molecular weight of about 5,000 to 300,000.

4. A composition of matter according to claim 1, wherein said polyolefin polymer is poly (3-methyl butene-1).

5. A composition of matter according to claim 1, wherein said polyolefin polymer is poly (2-methyl pentene-1).

6. A composition of matter according to claim 1, wherein said polyolefin polymer is poly (4-methyl pentene-1).

7. A composition of matter useful as a wax coating composition comprising a major proportion of paraffin wax having a melting point of about 130 to 140° F., 0.5 to 6 wt. percent of polyethylene having a Staudinger molecular weight of about 5,000 to 300,000, and 1 to 20 wt. percent of a polyolefin polymer of a methyl substituted mono-olefin-1 containing a total of 5 to 8 carbon atoms and having a Staudinger molecular weight of about 1000 to 100,000.

8. A composition of matter useful as a wax coating composition comprising a major proportion of paraffin wax having a melting point of from about 130 to 140° F., 0.5 to 6 wt. percent of polyethylene having a Staudinger molecular weight of about 5,000 to 300,000, and 1 to 20 wt. percent of poly (3-methyl butene-1) having a Staudinger molecular weight of from 1,000 to 100,000.

9. A composition of matter useful as a wax coating composition comprising a major proportion of paraffin wax having a melting point of about 130 to 140° F., 0.5 to 6 wt. percent of polyethylene having a Staudinger molecular weight of about 5,000 to 300,000, and 1 to 20 wt. percent of poly (2-methyl pentene-1) having a Staudinger molecular weight of from 1,000 to 100,000.

10. A composition of matter useful as a wax coating composition comprising a major proportion of paraffin wax having a melting point of about 130 to 140° F., 0.5 to 6 wt. percent of polyethylene having a Staudinger molecular weight of about 5,000 to 300,000, and 1 to 20 wt. percent of poly (4-methyl pentene-1) having a Staudinger molecular weight of from 1,000 to 100,000.

References Cited by the Examiner

UNITED STATES PATENTS

| | | | |
|---|---|---|---|
| 2,854,435 | 9/58 | Briggs et al. | 260—45.5 |
| 2,882,246 | 4/59 | Leatherman et al. | 260—28.5 |

MORRIS LIEBMAN, *Primary Examiner.*